May 20, 1924.

H. AUSTIN

DETACHABLE WHEEL

Filed July 9, 1923

1,494,942

Herbert Austin

By S McColl

Patented May 20, 1924.

1,494,942

UNITED STATES PATENT OFFICE.

HERBERT AUSTIN, OF BROMSGROVE, ENGLAND.

DETACHABLE WHEEL.

Application filed July 9, 1923. Serial No. 650,478.

*To all whom it may concern:*

Be it known that I, HERBERT AUSTIN, a subject of the King of Great Britain, residing at Lickey Grange, Bromsgrove, in the county of Worcester, England, have invented certain new and useful Improvements in or Relating to Detachable Wheels, of which the following is a specification.

This invention relates to detachable wheels for motor road vehicles, and has for its object to provide improved means by which a detachable wheel is secured in relation to the permanent hub.

A convenient application of the invention is described by reference to the drawings herewith, of which:—

The portion $b'$ of the permanent hub B has a short cylindrical surface $b^2$ upon which a cylindrical portion $a^3$ of the removable hub A is adapted to slide. The flanges $d$ and $d'$ of the permanent hub B carry a set of studs $h$ each of which is provided with a nut $j$, the latter being formed with a taper portion at its inner face.

Figure 1:
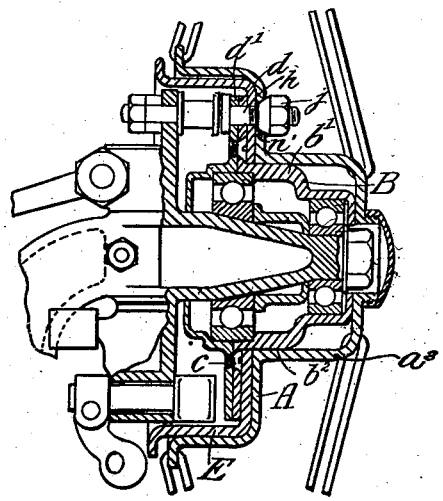
Figure 1 is a longitudinal vertical section of the hub and axle end of the front steering wheel of a motor vehicle.
Figure 3:
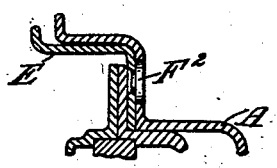
Figure 2:
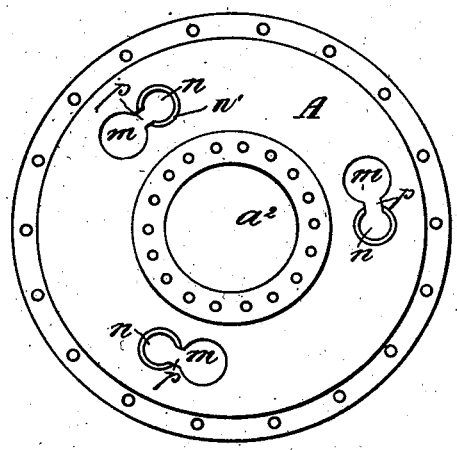
Figure 2 is a view of the outer face of one of the detachable hubs. In this view, although the holes in the hub for connecting the spokes thereto are shown, the spokes themselves have been omitted for the sake of clearness; and, Figure 3 is a detail view in section.

The removable hub A is provided with three holes $m$ (see Figure 2) of a diameter sufficient to allow the nuts $j$ to pass right through. It is also provided with a set of holes $n$ each formed taper as shown at $n'$ in Figs. 1 and 2 and of such a diameter that the taper portion of the nuts when screwed up upon the studs may tighten into the holes $n$. Each of the holes $n$ connects with one of the holes $m$ by opening $p$, the openings being of just sufficient width to clear the studs $h$.

In putting the wheel in place its removable hub A is put on over the permanent hub B, and it is, in the first instance, held in such relation thereto that the nuts $j$ coincide with the holes $m$ allowing the removable hub to be pushed on to the fullest extent. The wheel is then given a slight turn in an anti-clockwise direction causing the studs in effect to pass through the openings $p$ and enter the holes $n$. The nuts are then tightened up securely with their taper portions within the taper holes $n$. As the taper portions of the nuts are greater in diameter than the width of the opening $p$ the wheel cannot move back until the nuts are again slackened.

In order to provide additional security against the turning of the brake drum E in relation to the wheel it is provided with studs $F^2$ (see Figure 4) which fit within the holes $m$ of larger diameter when the wheel is in place.

In order to remove a wheel, it is simply necessary to slack back the nuts two or three turns, move the wheel outward slightly to clear the holes $m$ of larger diameter from studs F and then turn the wheel round in a clockwise direction until the larger holes $m$ coincide with the nuts, when the wheel is free to be taken off.

The advantage of securing the hub as above described is that the necessity for removing the nuts and washers or the set pins, as is now usually the case, is avoided, thus saving the time taken in screwing the nuts or set pins right off and avoiding also any liability of their becoming lost.

Having fully described my invention, what I claim as new and desire to secure by Letters Patent is:—

In a detachable wheel for motor vehicles, a permanent hub, a removable hub fitting over said permanent hub and removable with the wheel, a flange on the removable hub having holes formed in pairs therein, the holes of each pair being side by side and of different diameters, the larger holes being of sufficient diameter to be passed over the usual fasteners carried by the permanent hub and by which the removable hub is secured in place, the smaller of such holes being of such diameter that an inwardly projecting portion of a fastener may enter each of said holes when said fasteners are tightened up, and an opening cut across between the holes of each pair, whereby when the fasteners are slackened back the wheel may be given a slight turn in relation to the permanent hub to cause the fastener heads to pass along the openings into the larger holes and permit the wheel being removed, said openings being of such smaller width than the diameter of the smaller hole as to prevent the turning of the wheel until the fasteners have been slackened back.

In witness whereof I have hereunto signed my name this 26th day of June 1923.

HERBERT AUSTIN.